United States Patent Office 2,959,849
Patented Nov. 15, 1960

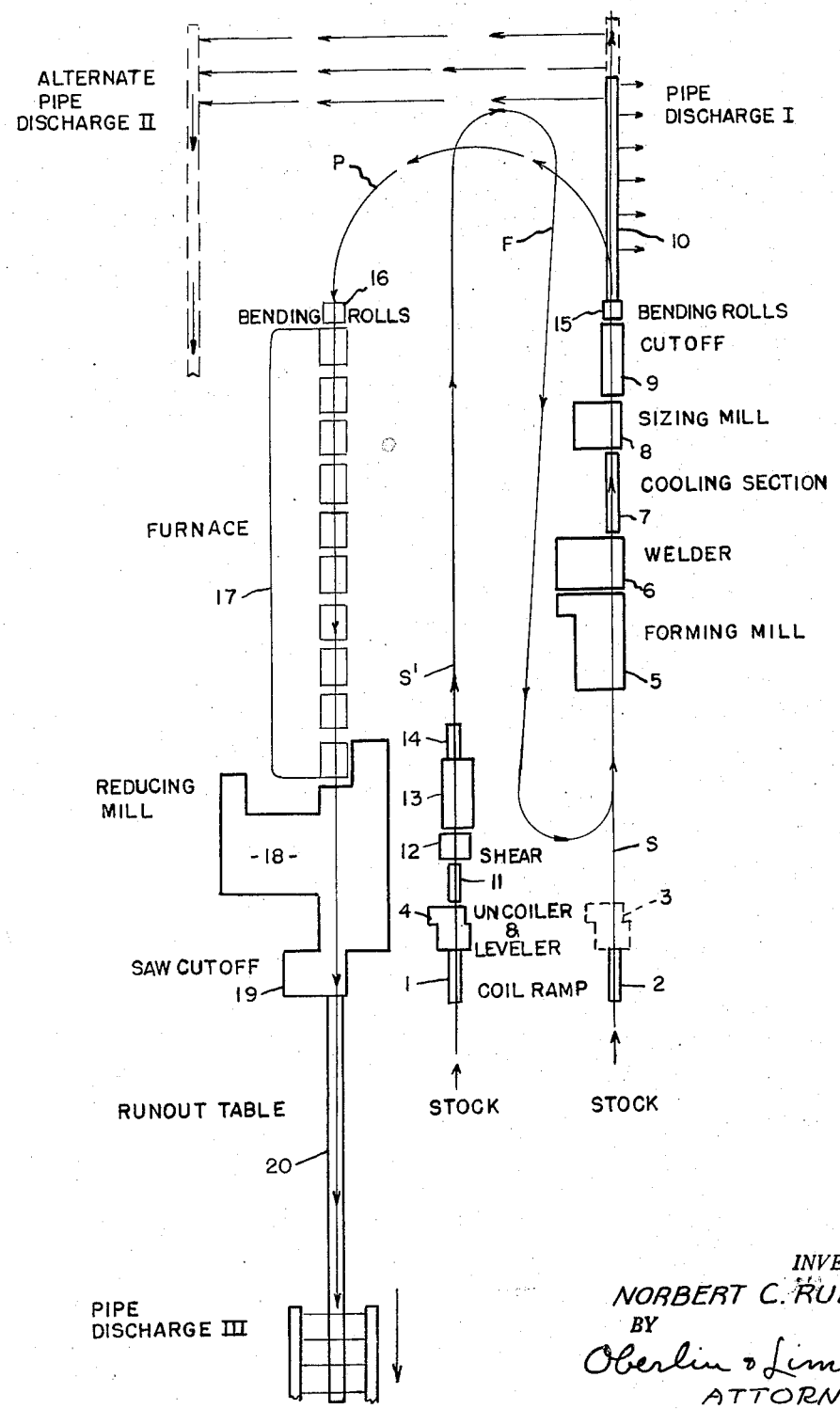

2,959,849

METHOD AND APPARATUS FOR MAKING PIPE

Norbert C. Rubin, Lakewood, Ohio, assignor to The Yoder Company, Cleveland, Ohio, a corporation of Ohio Filed Sept. 14, 1956, Ser. No. 609,939

6 Claims. (Cl. 29—417)

This invention relates as indicated to a novel apparatus and method for making metal tube, and more particularly to a method of making steel pipe continuously from coiled flat strip material.

In the continuous manufacture of tubing and pipe from flat strip material, the operation is not stopped when a coil of stock has run out, but instead the leading end of a new coil is welded to the trailing end of the preceding coil and, to make this possible without interruption of the pipe forming process, a loop is ordinarily formed in the stock to be taken up by the pipe forming mill during the period of time required for such welding operation. When the strip has been formed to tubular shape, a variety of different methods may be employed to weld the opposed longitudinally extending seam edges together, these methods including the continuous butt weld, electric resistance welding, electric induction welding, submerged arc welding and gas welding. In the butt weld method, the steel stock passes through a furnace where it is heated to approximately 2450° F., and blow nozzles are provided to increase the temperature of the longitudinally extending edges to about 2600° F. The heated stock is then hot formed into tubular shape by passage through a series of roll stands and the opposed heated edges of the longitudinally extending seam are squeezed together by the welding rolls to form the weld. A serious disadvantage of this well-known method is that heavy scale is formed on the pipe due to the high temperature to which the body of the stock is heated, and such scale must be removed, and constitutes a substantial loss of material.

In the other listed methods, the stock is cold roll formed into tubular shape, and the opposed edge portions are more locally heated and welded together. Such methods have the advantage of producing substantially scale-free pipe, but it is necessary to maintain a wide range of stock sizes (strip width and thickness) as well as a variety of different sizes of forming rolls, etc., to meet orders for different sizes of pipe. This requires the maintenance of a relatively expensive inventory and also involves considerable down time when changing from one size to another. The hot butt weld method previously described has the advantage that pipe thus produced may subsequently be hot stretch reduced to produce several smaller sizes of pipe of desired wall thickness and diameter, the temperature to which the stock was raised in the furnace being more than sufficient for this operation. The formation of excessive scale is, however, a serious drawback.

It is accordingly an important object of my invention to provide a continuous method of making tube in which a wide range of sizes can be made from a few sizes of stock and without excessive scale formation.

Another object of my invention is to provide a method and apparatus for making tube which will be extremely flexible in operation and permit a wide variety of sizes to be produced thereby with a minimum of down time for readjustment of the mill.

Still another object is to provide a method and apparatus for producing tube, and especially steel tube, at a very high rate.

A further object is to provide such method of producing tube which will be relatively inexpensive in operation.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Said annexed drawing comprises a diagrammatic layout illustrating one form of pipe mill embodying the principles of my invention.

Referring now more particularly to said drawing, the flat metal (e.g. steel) strip S may be introduced to the mill at either coil ramp 1 or 2. If introduced at ramp 2, it will pass through uncoiler and leveler 3 (the same uncoiler and leveler may be mounted for shifting between stations 3 and 4 as needed) before being conducted to cold forming mill 5 where it is roll formed to tubular shape. Such cold forming mill may desirably be a conventional Yoder mill, for example. The preformed tube now passes to the welder 6 which may be of any desired type but will preferably be an electric resistance welder (such as the Yoder welder utilizing rotary electrodes) or an induction welder such as that disclosed in Crawford Patent 2,687,464 or Abel application Serial No. 432,290, filed May 25, 1954. After passing through a cooling section 7 and a sizing mill 8, where the diameter of the tube or pipe may be slightly cold reduced, the continuous pipe reaches cut-off 9 and delivery table 10 where sections of pipe of the desired length may be laterally discharged to either side as indicated in the drawing.

The pipe mill just described above is of a type well known in the trade and is not per se my invention. I provide associated means, however, whereby this same mill may be utilized in the production of pipe, and more particularly commercial steel plumbing pipe of from about ½" to about 4" nominal diameters, utilizing a minimum of initial stock sizes and a minimum number of forming roll sets for mill 5.

In this further arrangement and operation, the steel stock S' is introduced at coil ramp 1 and passes through uncoiler and leveler 4 across guide table 11 to shear 12 where the trailing and leading ends of adjacent lengths of strip may be cut for joining by flash welder and stripper 13. The continuous strip S' now passes through clamp and strip positioner 14 and is conducted in a long loop or festoon F back to enter forming mill 5. Just as in the case of strip S, strip S' now passes through forming mill 5, welder 6, cooling section 7, sizing mill 8 (sometimes omitted) to bending rolls 15, cut-off 9 being inoperative. The bent pipe P describes an arc of approximately 180° and enters bending or straightening rolls 16 which straighten and direct the pipe through furnace 17. It will be appreciated that up to the present time strip S' and pipe P have not been heated at all except very locally at the welded seam. Long furnace 17 now heats the pipe to raise the same to a temperature of about 1600–1950° F. to facilitate the following stretch reduction operation. It will be noted that this temperature is very much below that employed in the old well-known butt weld method, and consequently very little scale is now formed. The uniformly heated pipe passes from the furnace into hot stretch reducing mill 18 which will be of generally conventional construction and will ordinarily comprise a series of from 12–16 roll stands, each stand consisting of two or more power driven rolls. Each such roll stand may reduce the diameter of the pipe about 8–12% of the diameter at which it enters such stand. The speed at which each set of rolls is driven is individually adjustable, as by providing a separate D.C. motor for each set of rolls, and by controlling the speed of each roll pass the heated pipe can be stretched to a greater extent than would normally result from elongation due merely to diameter reduction, thus affording an operation of diameter reduction in which the pipe wall thickness may be maintained, increased, or reduced as desired. By controlling the speeds of the motors, the pipe can be accurately made to correct wall thickness for each commercial diameter. After the reducing operation, the pipe is cut into lengths by flying saw 19 traveling at the same speed as the pipe during the cutting operation and the cut-off lengths travel along run-out table 20 to the discharge station.

Not only does the mill layout illustrated in the drawing provide a particularly efficient and compact arrangement, but also the generally semi-circular loop of welded pipe extending from bending rolls 15 to bending rolls 16 is capable of a considerable amount of expansion and shrinkage without interfering with the operation of the forming mill 5 and reducing mill 18. This is of considerable importance inasmuch as it is rather difficult to control the speeds of these two mills so exactly that the desired results would be obtained if they were in line.

The stock employed in the manufacture of commercial plumbing pipe will ordinarily be hot rolled steel such as skelp in cold condition. Cold rolled strip could be employed but would not ordinarily be economical. The welded pipe P will ordinarily still be cold when it enters furnace 17 and the temperature to which it will be heated in such furnace will depend to some extent on the degree to which the pipe is to be hot stretch reduced in the subsequent reducing mill 18. In some cases a temperature even as low as about 1100° F. may be adequate to enable the proper performance of a minor hot stretch reduction operation. In any event, the temperature to which it is necessary to raise the pipe for this operation is very much below that now commercially employed where the entire stock has required to be heated nearly to welding temperature.

A mill of the type described is capable of producing pipe at a rate on the order of 900 to 1,000 feet per minute, or more, depending on the welding capacity, reduction of area, and limitations in the speed of the flying saw.

The heating of the pipe in furnace 17, while insufficient to have appreciable deleterious effect, is of further advantage in annealing the welded seam and relieving stresses.

It will be seen from the foregoing that I employ a method of manufacturing pipe wherein cold stock is formed into tubular shape and welded while still cold, followed by a limited heating stage and hot stretch reduction. Employment of this new method and special arrangement of apparatus permits high speed production of a wide variety of pipe sizes of improved quality (inasmuch as the methods of welding which may be employed are superior to the usual butt weld). The financial investment in the plant and also the operating cost are considerably lower than in the case of the conventional butt weld mill followed by a hot stretch reducing mill. When the size pipe desired is that regularly produced by forming mill 5 without the necessity of subsequent hot stretch reduction, the pipe may be cut off directly after passing through sizing mill 8 and there is no need to maintain furnace 17 at heat under such circumstances. In an ordinary butt welding operation, however, the stock will of necessity be heated to high temperature whether or not it is subsequently to be hot stretch reduced.

I find that with two sets of forming rolls for mill 5 and three hot rolled strip dimensions, I can now produce 20 standard sizes of pipe while maintaining the wall thickness of the latter to within 1% of the target specification. When inexpensive hot rolled skelp is used, of course, the edges of the strip may be upset in forming mill 5 by engagement with a conventional fin roll, for example, in order to condition the same prior to performance of the welding operation.

As shown in the drawing and described above, I not only provide for a loop (or several) in the strip being fed to forming mill 5 but also for a loop in the welded tube or pipe intermediate such mill and the reducing mill 18, and ordinarily preferably between the welder and the furnace. Such latter loop affords take-up between the cold forming station and the subsequent hot working station.

In the specific example described above, a variety of different types of welding operations may be employed but electric welding, and especially rotary electrode resistance welding, or induction welding as taught in the aforementioned Abel application, is ordinarily preferred. The important thing is not to heat the body of the tubular blank during the forming and welding operations to a temperature where excessive scale will be produced. In practice, such temperature is excessive for my purpose if it is substantially above that required for proper performance of the subsequent hot stretch reduction process. Not only is a very objectionable amount of scale produced under such conditions but also the cost of operation rises very rapidly with the temperature.

Tube of other metals than the usual steel may also be formed, welded, and hot stretch reduced in accordance with my invention, including brass, aluminum, and stainless steel. These metals may best be welded by the method taught in such Crawford Patent 2,687,464. Tube of such metals has not previously been commercially hot stretch reduced. The temperatures to which tube of such metals should be raised in furnace 17 for performance of this operation will differ substantially from that employed for carbon steel, the following being illustrative:

Aluminum (common grades) _____ 400° F.–1100° F.
Brass (70–30) _____ 750° F.–1300° F.

The selected temperature will depend on the composition of the metal (ordinarily an alloy), on physical dimensions, or desired grain structure, and on the degree of reduction to be achieved. Little or no scale is produced on non-ferrous metals at these temperatures and grain structure is readily controllable by selection of a temperature which both permits the desired hot stretch reduction and ensures the desired grain structure. Of course, a wide range of end product diameters is obtainable while stocking but a small number of strip sizes and high speed production is possible.

The term "tube" as used herein and in the claims is intended to be inclusive of pipe and tubing of all types.

Other modes of applying the principle of the invention may be employed, change being made as regards the details described, provided the features stated in any of the following claims or the equivalent of such be employed.

I therefore particularly point out and distinctly claim as my invention:

1. The method of producing steel tube which comprises in sequence the steps of welding the leading edge of a following length of hot rolled steel strip to the trailing end of a preceding length of hot rolled steel strip, forming a large loop in such strip to permit performance of such welding operation while continuously advancing such preceding length through a cold forming operation, cold forming such strip to tubular form with a longitudinally extending seam, progressively welding the opposed seam edges of the cold tubular blank thus formed by locally heating such edges and pressing them forcibly together, forming the tube thus produced into an adjustable loop, heating such tube to a temperature on the order of 1100° F. to 1950° F. sufficient to facilitate subsequent reduction but far below welding temperature such as 2450° F. where excessive scale is produced, hot stretch reducing such heated tube, and then cutting such tube into lengths.

2. The method of claim 1, wherein the finished tube is also subjected to a pickling operation.

3. The method of claim 1, employing cold rolled steel instead of hot rolled steel.

4. The method of claim 1, wherein such heated tube is stretched to change its wall thickness as well as its diameter.

5. The method of claim 1, wherein such welding operation is an electric welding operation.

6. The method of claim 1, wherein such welding operation is an electric resistance welding operation.

References Cited in the file of this patent

UNITED STATES PATENTS

| | | |
|---|---|---|
| 1,313,025 | Smith | Aug. 12, 1919 |
| 2,024,485 | Sussman | Dec. 17, 1935 |
| 2,051,948 | Inscho | Aug. 25, 1936 |
| 2,265,052 | Anderson | Dec. 2, 1941 |
| 2,277,658 | Anderson | Mar. 31, 1942 |
| 2,698,951 | Van Haandel | Jan. 11, 1955 |